United States Patent
Vallejos et al.

(10) Patent No.: US 6,405,799 B1
(45) Date of Patent: Jun. 18, 2002

(54) PROCESS FOR IN SITU UPGRADING OF HEAVY HYDROCARBON

(75) Inventors: Carlos Vallejos, Estado Miranda; Tito Vasquez, Estado Mirando; Gerson Siachoque; Ignacio Layrisse, both of Estado Miranda, all of (VE)

(73) Assignee: Intevep, S.A., Caracas (VE)

(*) Notice: Subject to any disclaimer, the term of this patent is extended or adjusted under 35 U.S.C. 154(b) by 0 days.

(21) Appl. No.: 09/605,074

(22) Filed: Jun. 28, 2000

(30) Foreign Application Priority Data

Jun. 29, 1999 (VE) .......................................... 99-001276

(51) Int. Cl.[7] ............................................. E21B 43/22
(52) U.S. Cl. ..................... 166/263; 166/267; 166/305.1
(58) Field of Search ................................. 166/263, 267, 166/303, 305.1

(56) References Cited

U.S. PATENT DOCUMENTS

| | | | | |
|---|---|---|---|---|
| 2,412,765 A | * | 12/1946 | Buddrus et al. | 166/267 X |
| 3,386,513 A | * | 6/1968 | Holmes | 166/267 X |
| 3,945,435 A | * | 3/1976 | Barry | 166/267 |
| 3,954,141 A | * | 5/1976 | Allen et al. | 166/305.1 X |
| 4,007,785 A | * | 2/1977 | Allen et al. | 166/263 |
| 4,223,728 A | * | 9/1980 | Pegg | 166/267 X |
| 4,280,559 A | * | 7/1981 | Best | 166/303 |
| 4,362,212 A | * | 12/1982 | Schulz | 166/263 X |
| 4,450,913 A | * | 5/1984 | Allen et al. | 166/303 |
| 4,643,252 A | | 2/1987 | Kovarik | 166/263 |
| 5,425,422 A | * | 6/1995 | Jamaluddin et al. | 166/267 |
| 5,891,829 A | * | 4/1999 | Vallejos et al. | 507/202 |
| 6,230,814 B1 | * | 5/2001 | Nasr et al. | 166/263 X |

* cited by examiner

*Primary Examiner*—George Suchfield
(74) *Attorney, Agent, or Firm*—Bachman & LaPointe, P.C.

(57) ABSTRACT

A process for in situ upgrading of a heavy hydrocarbon includes the steps of (a) positioning a well in a reservoir containing a heavy hydrocarbon having an initial API gravity of less than or equal to about 8; (b) injecting a light solvent into the well at reservoir conditions so as to provide an upgraded hydrocarbon in the reservoir, the upgraded hydrocarbon having an improved API gravity greater than the initial API gravity; and (c) producing the upgraded hydrocarbon from the well.

12 Claims, 3 Drawing Sheets

PROCESS FOR IN SITU UPGRADING OF HEAVY HYDROCARBON

BACKGROUND OF THE INVENTION

The invention relates to a method for in situ upgrading of heavy hydrocarbon during a "huff and puff" or cyclic pressurizing and production technique.

Very large reserves of heavy hydrocarbons exist worldwide which could serve as an excellent source of useful hydrocarbons should an acceptable method of exploiting and producing these resources be developed.

A number of alternative methods have been proposed for producing such heavy hydrocarbons. These methods include the use of multiple wells including parallel horizontal wells drilled into water formations beneath the heavy hydrocarbon, and injection of various additives through the horizontal wells so as to assist in production from a separate well drilled into the producing formation. Unfortunately, this method requires the actual drilling of a potentially large number of wells for production from a single well, with the attendant increase in cost of labor and equipment, and also results in large amounts of potentially expensive additives being injected through the horizontal wells.

"Huff and puff" or cyclic pressurizing and production techniques are also known wherein a well is pressurized for a period of time, and then allowed to produce. This method can provide enhanced production for certain wells. However, with particularly heavy hydrocarbons, this technique certainly leaves room for improvement.

In light of the foregoing, it is clear that the need remains for an improved method for producing heavy hydrocarbons.

It is therefore the primary object of the present invention to provide a process for in situ upgrading of a heavy hydrocarbon whereby production is enhanced.

It is a further object of the present invention to provide such a process wherein the need for additives is reduced, and such additives can be recycled.

It is a still further object of the present invention to provide such a process wherein the hydrocarbon product when produced has been upgraded.

Other objects and advantages of the present invention will appear hereinbelow.

SUMMARY OF THE INVENTION

In accordance with the present invention, the foregoing objects and advantages have been readily attained.

According to the invention, a process is provided for in situ upgrading of a heavy hydrocarbon, which process comprises the steps of (a) positioning a well in a reservoir containing a heavy hydrocarbon having an initial API gravity of less than or equal to about 8; (b) injecting a light solvent into said well at reservoir conditions so as to provide an upgraded hydrocarbon in said reservoir, said upgraded hydrocarbon having an improved API gravity greater than said initial API gravity; and (c) producing said upgraded hydrocarbon from said well.

BRIEF DESCRIPTION OF THE DRAWINGS

A detailed description of preferred embodiments of the present invention follows, with reference to the attached drawings, wherein.

DETAILED DESCRIPTION OF PREFERRED EMBODIMENTS

Figure 1:
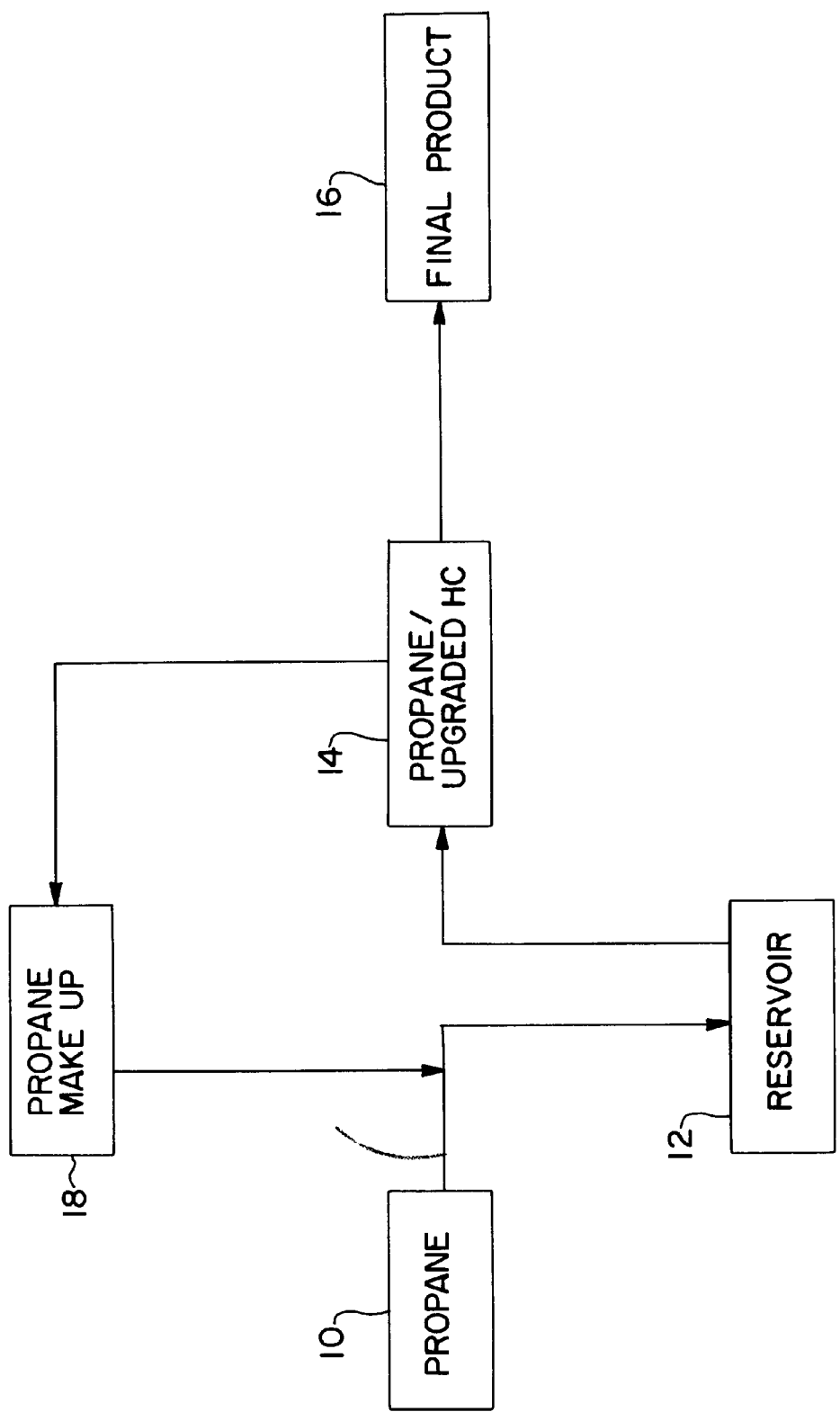
FIG. 1 is a schematic illustration of a process in accordance with the present invention.
Figure 2:
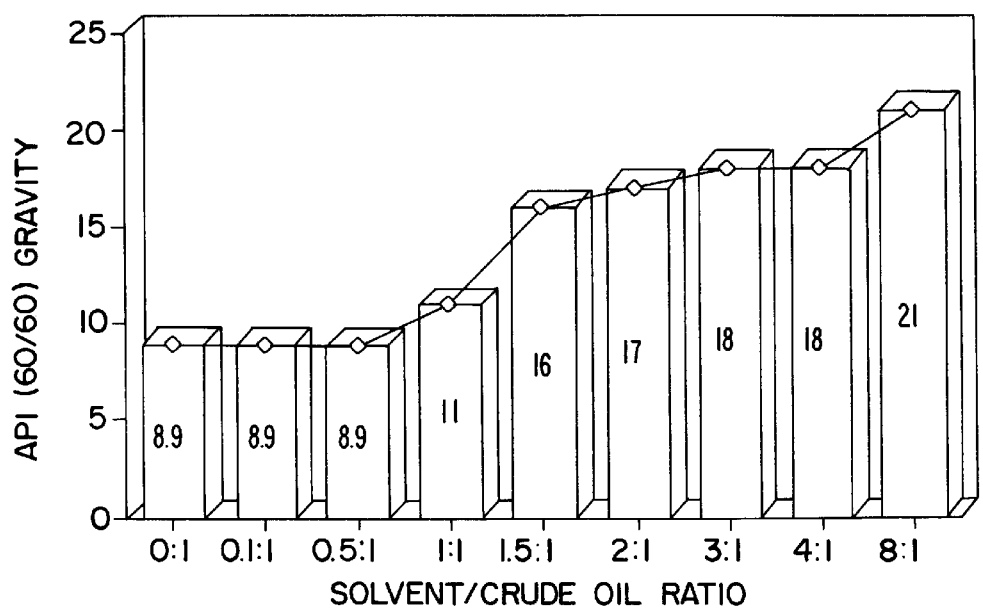
FIG. 2 illustrates API gravity of an upgraded product as a function of the solvent/crude oil ratio of the process of the present invention.
Figure 3:
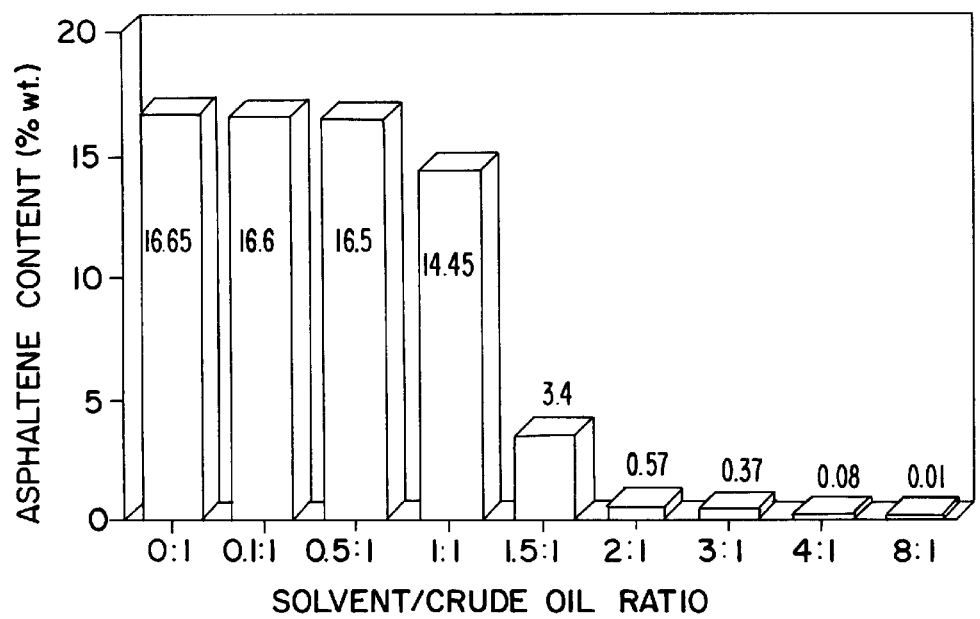
FIG. 3 illustrates asphaltene content of an upgraded product as a function of the solvent/crude oil ratio of the process of the present invention.
Figure 4:
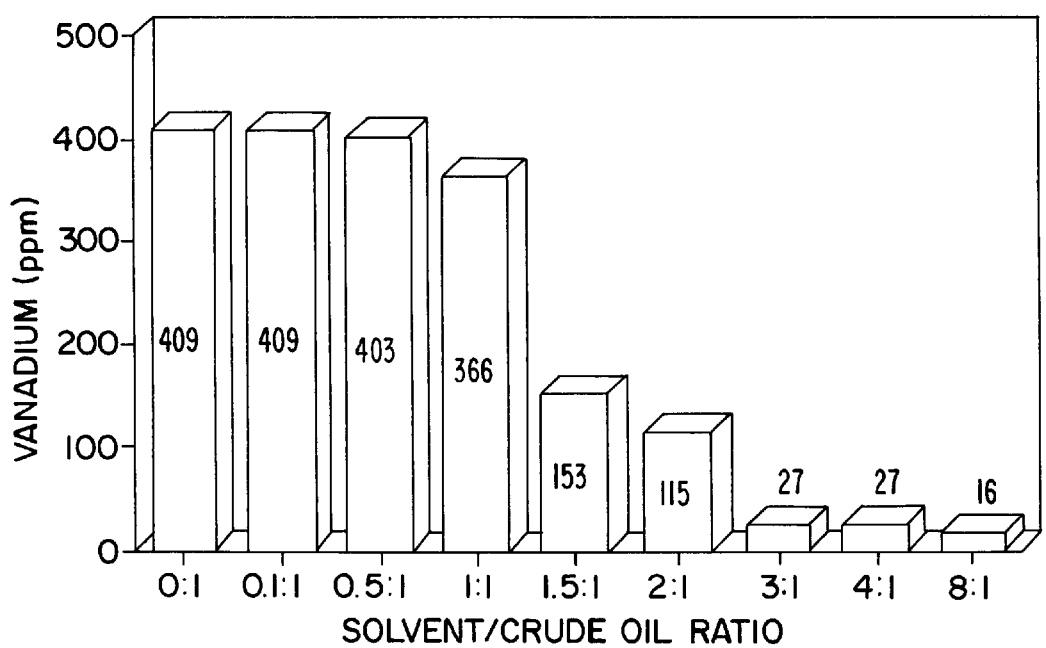
FIG. 4 illustrates vanadium content of an upgraded product as a function of the solvent/crude oil ratio of the process of the present invention.
Figure 5:
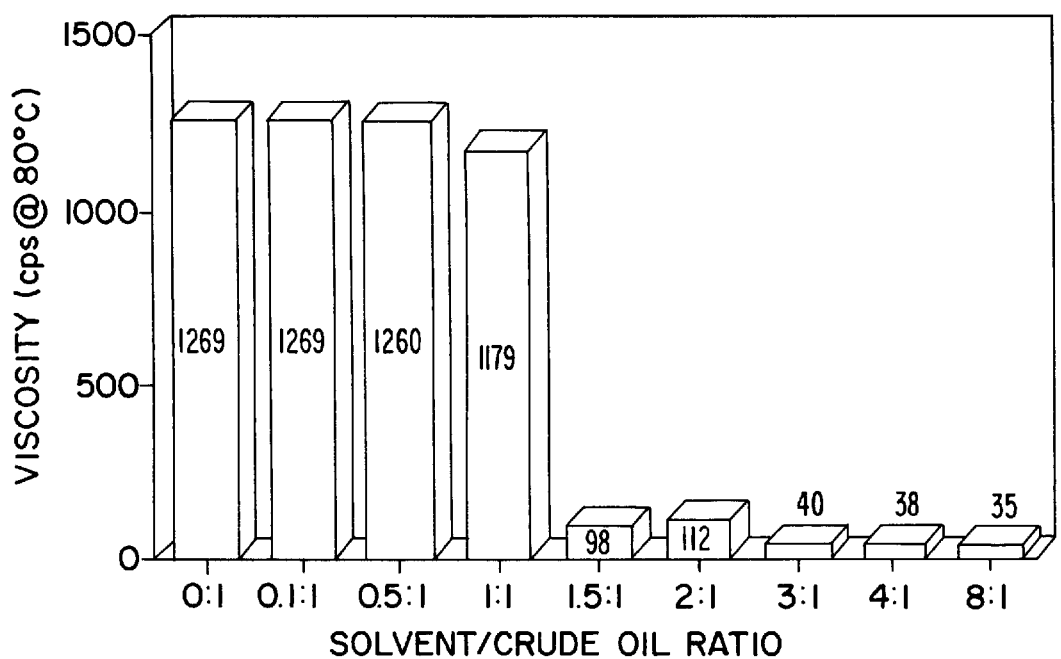
FIG. 5 illustrates viscosity of an upgraded product as a function of the solvent/crude oil ratio of the process of the present invention.

The invention relates to a process for in situ upgrading of a heavy hydrocarbon whereby production of the hydrocarbon is enhanced, and the final product has more valuable characteristics.

In accordance with the present invention, a process is provided for upgrading heavy hydrocarbons in a reservoir, which heavy hydrocarbons may be characterized by an API gravity of less than or equal to about 8, an asphaltene content by weight of at least about 16%, a vanadium content by weight of at least about 400 ppm, and a viscosity at 80° C. of at least about 1200 cps. In accordance with the present invention, this heavy hydrocarbon is upgraded, in situ, so as to provide an upgraded hydrocarbon having improved API gravity, asphaltene content, vanadium content and viscosity.

According to the invention, a light solvent is injected into a production well during the pressurizing or injection step of a conventional "huff and puff" production technique. This is carried out on a production well which is drilled into a formation containing the heavy hydrocarbon to be produced.

According to the invention, solvent is injected during an injection step wherein the well is confined to a pressure of at least about 200 psi, more preferably about 400 psi, and solvent is injected, preferably for a period of time of at least about 5 days, preferably at least about 10 days. Following the injection step, the same production well is then operated under production conditions so as to produce an upgraded hydrocarbon product as desired.

In accordance with the present invention, the injection step serves to upgrade the hydrocarbon, in the reservoir, so as to reduce viscosity, asphaltene content, and vanadium content, and to increase API gravity so as to provide a more valuable and more producible hydrocarbon product. This product preferably has an API gravity of at least about 11, more preferably at least about 16, and most preferably at least about 20, as well as an asphaltene content by weight of less than or equal to about 14%, preferably less than or equal to about 3.4%, and most preferably less than or equal to about 0.6%, a vanadium content by weight of less than or equal to about 360 ppm, preferably less than or equal to about 150 ppm, and most preferably less than or equal to about 115 ppm, and a viscosity at 80° C. of less than about 1200 cps, more preferably less than or equal to about 112 cps, and most preferably less than or equal to about 98 cps.

The injection is preferably carried out so as to expose the light solvent to heavy hydrocarbon at reservoir conditions including reservoir temperature of between about 60° C and about 130° C., and reservoir pressure of between about 400 psia and about 1600 psia.

In accordance with the invention, examples of suitable solvent include natural gas liquid (NGL) such as, for example, $C_1^+$–$C_6$ fractions, liquid propane and the like. A specific NGL useful according to the invention includes about 54% $C_3$, about 44% $C_4$, and the balance $C_5^+$.

In further accordance with the present invention, it has been discovered that excellent results are obtained in connection with in situ upgrading of heavy hydrocarbons through injection of specific amounts of solvent. In order to determine the amount of solvent to be injected, a well is selected to be treated. This well is then evaluated using an injectivity test, wherein a fluid, for example water, is injected into the well while monitoring pressure in the well, in the course of a day. The rate of injection is monitored to insure that the reservoir pressure remains below a particular threshold pressure which is determined by the reservoir. This is carried out so as to determine a liquid capacity of the well per day. For example, certain wells on which the process of the present invention have been carried out can accept between about 300 and about 500 barrels of liquid per day.

In accordance with the present invention, solvent is then injected at a ratio by volume of solvent to liquid capacity of the well of at least about 1:1, more preferably about 1.5:1, and most preferably at least about 2:1. It has been found that by injecting at a ratio of at least about 1:1, excellent results are obtained in connection with improving the characteristics of produced hydrocarbon.

The injectivity test referred to above is a method used for approximating the hydrocarbon to be contacted by solvent during an injection. Thus, the ratios of solvent as referred to above will be referred to herein as ratios of solvent to heavy hydrocarbon.

Referring now to FIG. 1, a process in accordance with the present invention is schematically illustrated. As shown, a volume of light solvent 10 is provided and injected into a producing reservoir 12 at the desired ratio of solvent to heavy hydrocarbon. Following a desired injection time, the same well is then operated at production conditions so as to produce a volume 14 of upgraded hydrocarbon and propane, which is separated so as to provide a final produced upgraded hydrocarbon product 16 having the desired improved characteristics and a recovered propane portion 18 which can be recycled for use in the initial injection step as desired. This advantageously avoids the need for additional wells, be they horizontal wells or otherwise, and also serves to minimize the amount of solvent or other additive injection, and provides for ease in recovery and recycling of same. Thus, the process of the present invention is advantageous in terms of cost of equipment, raw materials and labor. Furthermore, the process of the present invention advantageously provides for upgrading and production of heavy hydrocarbons which cannot otherwise be advantageously produced.

The following example demonstrates the advantageous upgrading of a heavy hydrocarbon using the process of the present invention.

EXAMPLE

This example demonstrates the results obtained using the process of the present invention including a ratio of solvent to heavy hydrocarbon by volume of at least about 1:1.

U.S. Pat. No. 4,643,252 to Kovarik is drawn to a carbon dioxide miscible displacement process wherein, during a huff and puff production technique, a small amount of solvent is injected. In the process of the '252 patent, propane is injected in order to create a zone of oil enriched in propane around the injection well before the injection of carbon dioxide which is intended to increase miscibility in a very narrow transition zone between the oil and the carbon dioxide. According to the '252 patent, propane is injected as a solvent slug varying in size from a few hundredths of the reservoir pore volume to 12% of the pore volume.

In the present example, tests were carried out using a PVT device at reservoir conditions including a pressure of 1,100 psia and a temperature of 139° F. (60° C.). Liquid propane was injected as solvent in this example at various ratios of solvent to heavy hydrocarbon of 0:1, 0.1:1 and 0.5:1 roughly approximating the teachings of the '252 patent, and also at ratios of 1:1 and higher corresponding to the process of the present invention. Following these injections, a hydrocarbon product was produced which was then analyzed for API gravity, asphaltene content, vanadium content and viscosity. Referring to FIGS. 2–5, the results are presented. As shown, at a ratio by volume of solvent to hydrocarbon of 1:1 and higher, excellent results are obtained, particularly when compared to results obtained using lower ratios. Improvement is seen at a ratio of 1:1, and becomes drastic at a ratio of 1.5:1, even more so at a ratio of 2:1.

Thus, the teachings of the '252 patent do not lead to any appreciable change in API gravity, asphaltene content, vanadium content or viscosity, while the present method provides significant improvement in each of these areas.

It is to be understood that the invention is not limited to the illustrations described and shown herein, which are deemed to be merely illustrative of the method for carrying out the present invention, and which are susceptible to modification of form, size, arrangement of parts and details of operation. The invention rather is intended to encompass all such modifications which are within its spirit and scope as defined by the claims.

What is claimed is:

1. A process for in situ upgrading of a heavy hydrocarbon comprising the steps of:

(a) positioning a well in a reservoir containing a heavy hydrocarbon having an initial API gravity of less than or equal to about 8, an asphaltene content of at least 16 wt %, a vanadium content of at least 400 ppm and a viscosity at 80° C. of at least 1200 cps;

(b) injecting a light solvent into said well at a ratio by volume of solvent to heavy hydrocarbon of at least about 1:1 under reservoir conditions so as to provide an upgraded hydrocarbon in said reservoir, said upgraded hydrocarbon having an improved API gravity greater than said initial API gravity, a reduction in asphaltene and vanadium contents, and lower viscosity; and (c) producing said upgraded hydrocarbon from said well.

2. A process according to claim 1, wherein said light solvent is injected at a ratio by volume of solvent to heavy hydrocarbon of at least about 1.5:1.

3. A process according to claim 1, further comprising the steps of separating said light solvent from said upgraded hydrocarbon so as to provide a recycled solvent for said injecting step.

4. A process according to claim 1, wherein said light solvent is liquid natural gas.

5. A process according to claim 1, wherein said light solvent is liquid propane.

6. A process according to claim 1, wherein said light solvent comprises $C_1$–$C_6$ fractions.

7. A process according to claim 1, wherein said light solvent comprises about 54% volume $C_3$, about 44% volume $C_4$, balance $C_5^{30}$.

8. A process according to claim 1, wherein said heavy hydrocarbon has an initial viscosity, and wherein said upgraded hydrocarbon has a reduced viscosity which is less than said initial viscosity.

9. A process according to claim 1, wherein said light solvent is mixed with said heavy hydrocarbon at reservoir conditions.

10. A process according to claim 9, wherein said reservoir conditions include a temperature of between about 60° C. and about 130° C.

11. A process according to claim 9, wherein said reservoir conditions include a pressure of between about 400 psia and about 1600 psia.

12. A process according to claim 1, further comprising the step of repeating steps (b) and (c).

* * * * *

UNITED STATES PATENT AND TRADEMARK OFFICE
CERTIFICATE OF CORRECTION

PATENT NO.    : 6,405,799 B1
DATED         : June 18, 2002
INVENTOR(S)   : Carlos Vallejos et al.

It is certified that error appears in the above-identified patent and that said Letters Patent is hereby corrected as shown below:

Column 4,
Line 52, delete the "," after the word "gravity".

Column 5,
Line 3, delete "$C_5^{30}$" and insert -- $C_5^+$ --.

Signed and Sealed this

Twenty-eighth Day of January, 2003

JAMES E. ROGAN
*Director of the United States Patent and Trademark Office*